PREDETERMINED CODE SWITCHING DEVICE

Filed Dec. 24, 1956 2 Sheets-Sheet 1

INVENTORS
ALFRED B. BENSON
WILLIAM D. THORNE

BY

James K. Misser
AGENT

PREDETERMINED CODE SWITCHING DEVICE

Filed Dec. 24, 1956 2 Sheets-Sheet 2

United States Patent Office 2,919,427

Patented Dec. 29, 1959

2,919,427

PREDETERMINED CODE SWITCHING DEVICE

Alfred B. Benson, Endicott, and William D. Thorne, Binghamton, N.Y., assignor to International Business Machines Corporation, New York, N.Y., a corporation of New York Application December 24, 1956, Serial No. 630,196

11 Claims. (Cl. 340—164)

The invention relates to selective switching systems and more particularly to switching systems which are respectively conditioned, controlled, and reset by carrier current pulses having different frequencies.

Heretofore, prior art devices have incorporated carrier current frequency switching systems, but these have been primarily based upon advancing the switching by a predetermined number of pulses delivered at some single carrier current frequency. Examples of switching systems of this type are shown in L. W. Bradley 2,700,757, dated January 25, 1955, and A. L. Sprecker et al. 2,754,495, dated July 10, 1956, both of which are assigned to the assignee of the present invention. It is to the improved operation of selectively operated switching of this general type that the invention is primarily directed.

While the present invention is suitable for use in any selective switching system in which a plurality of switching devices are connected to a common line, one of the prime uses would be in a switching system wherein it is desirable to selectively operate bells, signal units, and the like in some predetermined sequence by means of a plurality of carrier current frequencies superimposed on a standard sixty-cycle power line. This line may also supply other power consuming devices not necessarily responsive to the carrier current frequencies.

In the disclosed embodiment there may be provided a plurality of selectively operated switching devices spaced along a standard sixty-cycle domestic power line or the like. Associated with each switching device are first and second gating units which, in this instance, may include a pair of cold cathode tubes or similar electronic devices, each having a control anode connected to a separate tuned circuit. One of the tuned circuits is designed to respond only to a first carrier current frequency within predetermined limits, while the other is designed to respond only to a second carrier current frequency. All other frequencies have no effect on the gating units.

The two carrier current frequencies define a first or start and sound channel and a second or advance channel, respectively. The cathode side of the start and sound channel of each unit is connected to ground through the normally closed side of a cam operated transfer switch to a stepping coil which is intermittently energized to operate a setup mechanism. The cathode side of the advance channel is connected to the normally open side of the transfer switch and to the same coil for operating the setup mechanism. This mechanism is connected to intermittently advance a pair of cams, one of which operates the contact blade of the transfer switch, while the other operates a contact associated with the signalling or load member.

Whenever a pulse at the first frequency is applied on the start and sound channel, the stepping coil in each switching device is energized to advance the associated detent mechanism one position. After a number of first carrier current frequency pulses, the detenting mechanism acts through the related cam to transfer the blade of the transfer switch and open the circuit responding to the first frequency channel. Should the cams in the various devices be out of phase, additional first frequency pulses advance those devices whose contacts remain normal until they are transferred. After all of the switching devices are advanced and the related cams transfer the associated transfer blades, further first carrier current frequency pulses on the power line have no effect on the switching devices. The other cam in each device has its contact closing surface positioned some predetermined number of detent positions or steps from the related closing point. This distance may vary from device to device.

At the completion of the first carrier current frequency pulse phase, a pulse or group of advance pulses at the second carrier current frequency is applied to the power line. This second carrier current frequency operates its related section to provide conduction through the transferred contact to energize the stepping coil in each switching device in the manner previously described.

The number of pulses supplied on the advance channel at any given operation or cycle advances all of the cams in each device a like amount. However, only the switching devices to be operated by the reception of that particular number of advance pulses have their load control contacts closed. For example, if a particular switching device is adjusted to give a signal after receiving two advance pulses, only two advance pulses are applied over the power line. At this point the related cam will have closed the signal or load contact. All other switching devices which are not set to close at the end of two pulses will be advanced simultaneously; however, their related contacts will either remain open or have been opened, if previously closed. At this time a carrier current frequency pulse of relatively long duration, equal to the length of time the signal desired, is applied to the start and sound channel. This long pulse causes the first section to again conduct and pick a relay or the like to close the signal or load circuit to ring a bell or generate any desired signal.

At the end of this pulse, a series of pulses supplied at the second carrier current frequency on the advance channel operate the stepping coils in each of the switching devices until the transfer switch cams advance sufficiently to permit the transfer blade contacts to return to normal. All pulses received from this point on the advance channel have no effect on the switching devices.

It is, therefore, an object of the invention to provide a switching device for a signal unit which is conditioned for operation at one carrier current frequency and then set for operation by a second carrier current frequency.

It is another object of the invention to provide an improved selective switching system for a signal unit which provides for positive operation at selected intervals.

It is yet another object of the invention to provide a selective switching device for a signalling system which eliminates the possibility of extraneous pulses appearing on the line from advancing the switching unit to prematurely energize the signal circuit.

It is yet another object of the invention to provide an improved selective switching system for a signal unit which is set by a plurality of electrical pulses at a first carrier current frequency, closed to condition a work circuit with a predetermined number of selected pulses at a second carrier current frequency and then reset by a plurality of electrical pulses delivered at the second carrier current frequency.

It is another object of the invention to provide a selective switching unit for a signalling system which utilizes only the required number of a plurality of electrical pulses delivered at one carrier current frequency to condition the same for operation and only the required number of a plurality of electrical pulses delivered at a second carrier current frequency to return the switching system to its reset condition.

It is still another object of the invention to provide a selective switching circuit having a plurality of signalling units which utilize one group of pulses at one carrier current frequency to condition all units for operation followed by a predetermined number of pulses at a second carrier current frequency to close the work circuits of all signalling units set to operate at that number of pulses and then resetting all of the units with a series of pulses at the second carrier current frequency.

Other objects of the invention will be pointed out in the following description and claims and illustrated in the accompanying drawings, which disclose, by way of examples, the principle of the invention and the best mode, which has been contemplated, of applying that principle.

Figure 2:
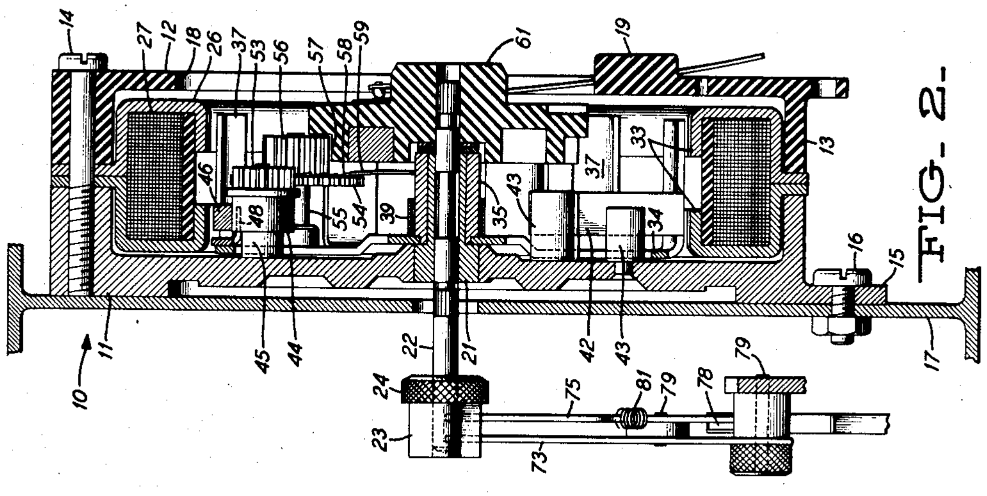
Fig. 2 is a vertical sectional view of the mechanism taken on the line II—II of Fig. 1.
Figure 1:
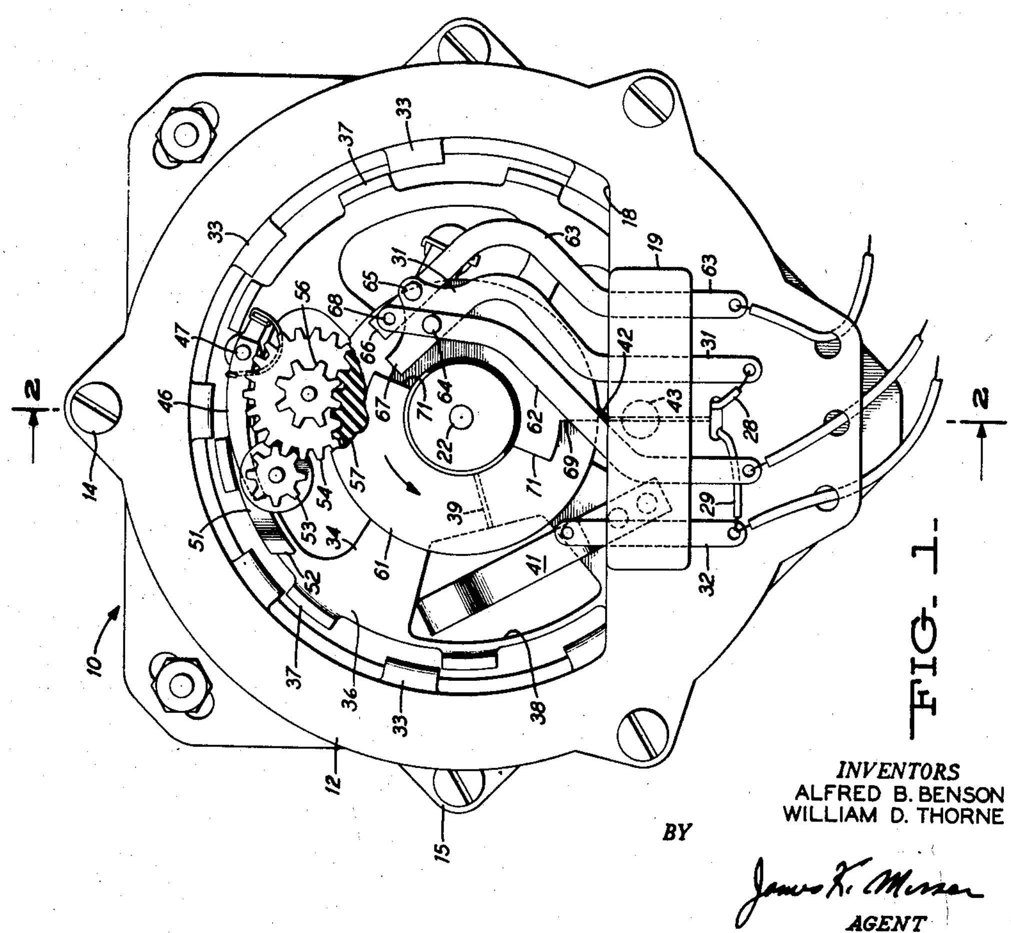
Fig. 1 is a rear elevational view, with portions in sections, of a mechanism to selectively operate the improved selective switching circuits for the signalling units in accordance with the invention.

Referring first to Figs. 1 and 2 for a description of a setup mechanism for housing and operating the improved switching circuit, there is shown a supporting means or housing 10, which may be formed of any suitable nonmagnetic material. The housing comprises a front wall 11, a rear wall 12, and a cylindrical side wall 13. This housing is also preferably divided into front and rear halves secured together by any suitable means such as, for example, screws 14. The forward portion of the housing may be formed with supporting lugs 15 having openings formed therein through which extend bolt means 16 for securing the housing 10 within a conventional clock casing or the like 17. The rear end wall 12 is formed with an enlarged opening 18 to permit access to the mechanism within the housing 10 and is also formed with a terminal mounting block 19 on the lower part thereof serving as a means for holding terminal straps for making electrical connections.

A bearing sleeve 21 fixed at one end thereof within a centrally located opening in the front wall 11 extends rearwardly coaxially within the housing as shown in Fig. 2. Journalled within the sleeve 21 is a shaft 22 which extends forwardly beyond the front end wall 11 and has a circumferentially adjustable load control switch operating cam means 23 secured to the outer forward end thereof. The adjustment of the angular position of the cam 23 may be provided by means of a suitable lock nut 24.

Arranged concentrically within the housing 10 and supported from the cylindrical side wall 13 thereof is a hollow annular supporting member 26 of suitable permeable material which embraces and supports an annular magnetic stepping coil 27. This coil is circularly wound in the conventional manner, and the two terminal wires 28 and 29 of the coil are shown in Fig. 1 as attached, respectively, to terminal straps 31 and 32 carried by the mounting block 19.

As shown in Fig. 2, the annular supporting member 26 is channel or U-shaped in cross-section with the open side of the U at the inner circumference thereof. The annular supporting member 26 includes a plurality of circumferentially spaced pairs of pole pieces 33. These pole pieces are preferably formed integral with the member 26 and extended inwardly toward one another across the inner periphery of the coil 26 to provide an air gap therebetween.

An oscillating armature 34 includes a hub 35, journalled on the axially disposed supporting sleeve 21, and a radially extending disk-like web 36, terminates at its periphery in a circular rim from which extends a plurality of separate circumferentially spaced flanges or armature elements 37. These elements coact with the pairs of pole pieces 33 and correspond in number and spacing to the pairs of pole pieces. The arrangement of the armature elements 37 is such that when the stepping magnet coil 27 is energized, the resulting magnetic force moves the armatures circumferentially into bridging relation with respect to their corresponding pairs of pole pieces and thereby rotates or rocks the armature 34 from its normal or nonenergized position.

Biasing means is provided for constantly urging the armature 34 to rotate in a direction opposite to the magnetic force of the coil 27 and back to its normal or nonenergized position. This biasing means comprises a weight 38 fixed to the outer end of a spring 39, the inner end of the spring being wound spirally around and anchored to the hub 35 of the armature. In order to dampen vibratory movements of the weight 38, a leaf spring 41 is fixed at one end to the web 36 of the armature and the other or outer end thereof lightly engages the side of the weight 38.

As shown in Fig. 2, a resilient stop device in the form of a leaf spring 42 is anchored to posts 43 extending inwardly from the end wall 11 of the housing 10. The spring 42 projects from the outer post 43 into the path of movement of one of the armature flanges 37, the latter striking the outer end of the spring 42 and being held thereagainst by the weight 38 to define the nonenergized or home position of the armature 34.

A motion-transmitting means is provided in the illustrative embodiment which functions to convert the oscillatory movement of the armature 34 between its energized and nonenergized positions into intermittent unidirectional rotation of the shaft 22. This means comprises a pawl and ratchet mechanism driving a train of gears with the last gear of the train being fixed to the shaft 22. As shown, a four-tooth ratchet wheel 44 is mounted for rotation about a fixed stud 45 projecting inwardly from the end wall 11 thereof. Coacting with the ratchet 44 is a pawl 46 pivotally mounted on a pin 47 extending from the rim 36 of the armature 34. The pawl is biased toward a stop flange 48 by a suitable spring 49.

The above construction and arrangement is such that when the armature 34 is rotated, due to energization of the coil 27, from its normal position to its energized position, the pawl 46 is carried back over one tooth of the ratchet wheel 44. When the coil is deenergized, the weight 38 rotates the armature back to its normal position, and in so doing, the pawl 46 engages a tooth of the ratchet wheel 44 and thereby advances the ratchet wheel counterclockwise, as viewed in Fig. 1, one increment of rotary movement. At the end of this advancing stroke, the pawl 46 overlies the next tooth of the ratchet wheel and thereby prevents overthrow movement of the ratchet and also holds the latter at the advanced position.

A plate 51 is pivoted to the rim of the armature 34 and is formed with an outwardly extending offset end portion 52 which is shaped so as to form a continuation of the pawl 46. When the armature 34 is rotated to its energized position, the offset portion 52 of the plate 51 follows the pawl 46 and at the end of such movement the portion 52 overlies two teeth of the ratchet wheel 44 and thereby locks the latter against movement in either direction. As the pawl 46 moves on an advancing stroke, the offset end portion 52 leads the pawl and releases the ratchet wheel for movement before it is engaged by the pawl.

As shown, a driving pinion 53, formed integral with the ratchet wheel 44, meshes with a gear 54 mounted for rotation on a stub shaft 55 fixed to the end wall 11 of the housing. A pinion gear 56 is fixed concentrically to the side of the gear 54 and meshes with a large gear 57 which is suitably fixed to the shaft 22 to provide the proper gear reduction. The side of the gear 54 may be formed with radially disposed ratchet teeth 58 which are adapted to be engaged by the outer free end of a leaf spring detent 59. As will be apparent, the spring detent 59 coacts with the teeth 58 to prevent retrograde movement of the gears and ratchet.

It will thus be seen that as the magnet coil 27 is energized and then de-energized, the armature 34 moves from its normal position to its energized position and then back to its normal position in an oscillatory manner, and in so doing, the increment of movement imparted to the ratchet wheel 44 by the pawl 46 is transmitted by the gearing just described to the shaft 22. As a result, the shaft is unidirectionally advanced or incremented a predetermined angular distance for each oscillation. A more detailed description of a mechanism of this type applied to a secondary clock mechanism is shown in R. B. Johnson et al. patent 2,510,583, dated June 6, 1950, and assigned to the assignee of the present invention.

In the illustrated embodiment, the terminal gear 57 of the driving train is composed of a suitable molded insulating material, and the rear face thereof is shaped to provide a cam surface 61, which functions to operate contacts formed as part of a transfer switch in a predetermined manner. As shown in Fig. 1, the terminal strap 31 previously mentioned and additional spring type terminal straps 62 and 63 are constructed with inwardly extending spring extensions and secured to the block 19 to provide transfer contacts. A contact point 64 is formed on the strap 62 which is adapted to engage the strap 31, and the latter is formed with a contact point 65 adapted to engage the strap 63. The spring strap 62 is biased toward the intermediate strap 31, and the spring strap 63 is biased away therefrom. The outermost end 66 of the spring extension 63 engages the cam face 61 adjacent the outer periphery thereof, and the outermost end 67 of the intermediate strip 31 engages the cam face 61 at points spaced radially inward of the end 66. The outermost end of the strap 62 carries a spacing pin 68 of insulating material which is adapted to engage the extension 63. The shape of the cam surface 61 is on the order of a helix with the axis of the gear 57 as the center.

As will be noted, the height of the cam surface 61 is the same along any given radial line, except at the high point of the cam surface where the outer portion engaged by extension 63 terminates at a drop off point 69 and the inner portion terminates at a drop off point 71 angularly spaced from the point 69. Thus for any portion of the cam surface 61, except the angular space between the points 69 and 71, the innermost ends 66 and 67 of extension strips 63 and 31, respectively, engage cam surfaces of the same height and the contact point 65 engages and thereby provides electrical contact between straps 31 and 63, and the spacing pin 68 engaging the extension 63 holds the strap 62 and its contact points 64 out of electrical contact with the intermediate strap 31.

As the mechanism advances, the cam surface 61 rotates in the direction of the arrow. Thus the end 66 of the strap 63 reaches its drop off point 69, while the end 67 of the strap 31 is still engaging a high part of the cam surface. As the end 66 of the strap 63 drops off the high point 69, it breaks the electrical connection with the intermediate strap 31 and permits the contact point 64 on the strap 62 to move with the latter into electrical engagement with the strap 31. The foregoing provides a simple form of transfer contact construction and actuating means therefor. After a predetermined number of increments of movement in the same direction, the cam 61 moves the drop off 71 in position, and the strap 31 returns the contacts 65 to their normally closed position.

Figures 3, 4, 5, 6:
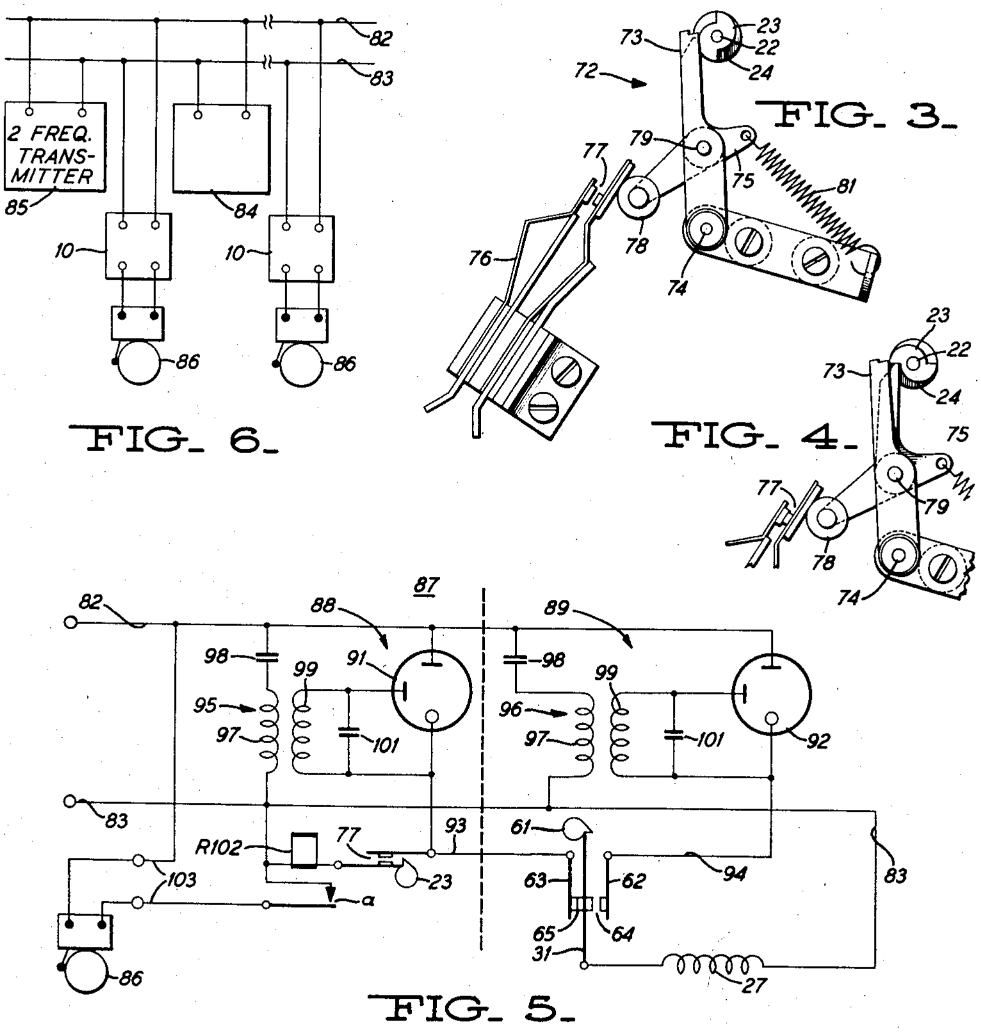
Fig. 3 is a partial front elevational view of the signal or load carrying contact in its open circuits position and the cam operating mechanism therefor.
Fig. 4 is a partial front elevational view of a portion of the mechanism shown in Fig. 3 with the signal or load carrying contact closed.
Fig. 5 is a schematic wiring diagram of one of the selectively operated switching circuits.
Fig. 6 is a diagrammatic illustration of a plurality of signalling units connected to a conventional power line.

As more clearly shown in Fig. 3 as the cam 23 is rotated, a follower mechanism 72, including a rocker arm 73 pivoted at 74 to the housing and a bell crank follower 75 are operated in a predetermined manner to actuate a signal or load carrying switch 76 having normally open contacts 77. Associated with one end of the bell crank lever 75 is a roller 78 which engages and actuates the switch. This bell crank lever is pivoted at 79 on the lever 73, and the entire follower mechanism 72 is urged for movement in a clockwise direction by means of a spring 81. The opposite end of the bell crank 75 is adapted to ride on the cam 23 as does the lever 73. During cam rotation, the bell crank 75 drops from the high portion of the cam 23 and is rocked in a clockwise direction to close the switch contacts 77 as shown in Fig. 4. During the next cam advance, the end of the lever 73 drops from the same cam surface, and the spring 81 then urges both levers in a clockwise direction. This moves the pivot 79 of the bell crank lever 75, and in so doing opens the load carrying switch contacts 77. The switch 76 is now opened and further operation of the load circuit is prevented.

Turning now to Fig. 6, there is shown a standard sixty-cycle power line of any suitable type having conductors 82 and 83 adapted to supply power to any load device or the like 84. Spaced at suitable points along the power line are the selective switching devices 10 of the present invention which respond to pulses supplied from a pulse generating device 85, selectively generated in any suitable manner. By way of example only, each switching unit is adapted to selectively operate a related bell, alarm or any other desired signal device 86.

Since in some installations it is desired to operate the bells at different time intervals, means must be provided to selectively operate them. One such means is diagrammatically shown in Fig. 5 wherein a single selective switching device 87 is illustrated. Due to the fact each of the switching devices is identical, with the exception of the angular position of the cam 23, only one of such devices will be described. In this embodiment first and second receiving units 88 and 89 incorporating electronic means in the form of cold cathode tubes 91 and 92 are shown in which the plate of each is connected to the power line 82, and the related cathodes are connected to the contact strips 62 and 63, respectively, of the transfer switch to provide first and second gating circuits 93 and 94, respectively. The blade portion 31 of the switch is connected to the line 83 through the setup or stepping magnet 27.

In order to selectively control the cold cathode tubes 91 and 92, each tube is provided with an individual tuned control circuit 95 and 96, respectively, connected to the related starter anodes. However, each tuned control circuit is designed to respond to a different carrier current frequency. Each tuned circuit, acting as a receiver, utilizes both series and parallel circuits. The series circuit includes a coil 97 and capacitor 98 designed to provide a low impedance at some predetermined frequency and a high impedance at all others. Inductively coupled with the coil 97 is a coil 99 paralleled by a capacitor 101 to form a parallel resonant circuit at the signal frequency. The voltage delivered across the latter circuit causes the related cold cathode tube to fire across the starting anode and cathode, which ionizes the gas in the tube and permits a discharge of the power frequency from the cathode to the anode. The discharge is extinguished on the first negative cycle of the power frequency following the end of the signal transmission.

Figure 7:
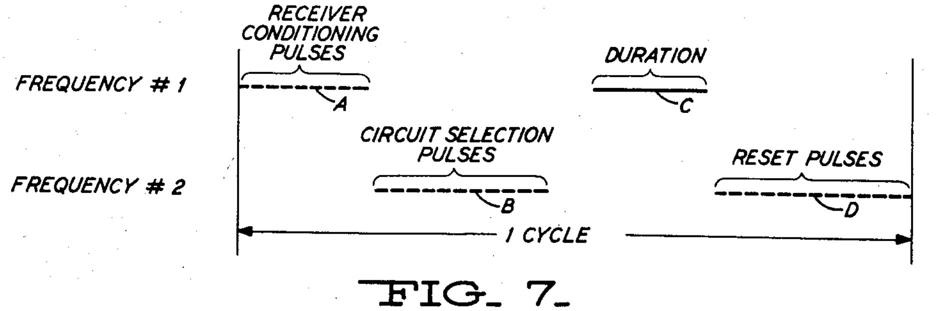
Fig. 7 is a chart showing one cycle of operation for one or more of the signalling units.

In this embodiment and by way of example, the first tube 91 has its tuned circuit 95 adapted to respond at a first carrier frequency of approximately 3,500 cycles, while the second tube 92 has its tuned circuit 96 adapted to respond to a second carrier current frequency of approximately 3,650 cycles. These carrier current frequencies may be defined as extending over bands or channels; that is, the first frequency may be defined as a start and sound channel, while the second frequency may be defined as an advance and reset channel as shown in Fig. 7. As an example, the short setup and advance pulses may be one second in duration, while the signal pulse would preferably be much longer.

As shown, the line 93 extending from the cathode of the first tube 91 is parallel connected to the contacts 63 and 77. The opposite side of the latter contact leads to a coil of a relay R102 which in turn is connected to the line 83. Associated with the relay R102 is a normally open contact **R102*a* connected in series with the signal or bell 86. Thus whenever the contact R102*a* closes, the bell 86 is energized from the power lines 82 and 83 through the related conductors 103. Likewise, it can be seen energization of the signal circuit 103 is dependent upon the closure of contact 77 by the cam 23 and conduction of the first cold cathode tube 91. It is only under these conditions that the bell 86** may be operated. All other conditions of receiver operation have no effect on the energization of the bell circuit.

The operation of the selective switching circuit is as follows: With the circuit as shown in Fig. 5, the switch circuit is in its inactive state. Now if a pulse is applied over the power lines 82 and 83 at the first frequency, the resonant circuit 95 conducts and fires the first cold cathode tube 91 in each switching device. Firing of this tube causes the power current to flow from the plate to the cathode over the line 93 and normally closed contacts 65 at the strip 63 and through the stepping coil 27 to the line 83. This generates a flux and attracts the armature 34 to rotate the same through the prescribed arc. At the end of the first carrier current frequency pure, the weight 38 returns the armature to normal or home position and in so doing simultaneously advances both cams 23 and 61 in each unit in the appropriate direction.

Each consecutive first frequency pulse delivered over the power lines as shown at A in Fig. 7 intermittently advances the cams in the same manner. As the edge 69 of the cam surface passes away from the edge of the strap, the blade 31 transfers to close the normally open contact 64. This opens the first gating circuit 93 and conditions the second gating circuit 94 and terminates the operation of that particular gating unit. All subsequent pulses received at the first frequency have no effect on the switching device after the blade 31 transfers.

At the end of the first group of pulses, all of the switching devices will be conditioned in the same angular position with respect to their cams, and all of the blades 31 will have been transferred. At this point, the drop off portion of the cams 23 are each at some predetermined incremental position from the edge of their related cam followers 72. The particular location of the drop off in a switching device will be dependent upon the desired sequence of operation. For example, switching device one may have its cam 23 angularly positioned to close its related contact 77 upon the reception of three advance pulses applied at the second frequency, while switching device two may have its cam positioned to close its related contact 77 after receiving six advance pulses. In either event the selected switching device only closes its related contact at the selected interval. At all other times, the contact 77 remains open. Thus as all of the units are advanced simultaneously and if one or more of the units are adjusted to close its load contact 77 upon receiving one advance pulse, the second advance pulse opens these contacts and closes all those which are adjusted for closure at the second advance pulse.

The means for precisely selecting the desired switching device is provided by the second carried current frequency. As mentioned, with all the switching devices resting with their blades 31 transferred, a pulse or predetermined number of signal circuit selection or advance pulses are applied at the second carrier current frequency. These pulses are indicated at B in Fig. 7. While a group of pulses are indicated, the number of pulses delivered depends upon the signal circuit selected for operation. This action on the advance channel provides resonance at the second tuned circuit 96 and causes the related tube 92 to conduct in the same manner as the first tube 91. Conduction of the tube 92 extends over the second gating circuit 94, through the transferred contacts 64 to the coil 27 and advances the cams 23 and 61 one position for each pulse as previously described.

In the example given, after three B pulses at the advance channel frequency, the related contact 77 is closed by the associated cam 23. The selection of the number of pulses on the line is predetermined, and no further B pulse or pulses would be delivered on the advance channel. In this manner, only those switching devices set for contact closure at three pulses would be in position for operation. All other contacts in the other switching devices will be open.

After this advance operation, a single pulse at the first carrier current frequency is supplied on the start and sound channel. This pulse is indicated at C in Fig. 7 and will have a duration equal in length to the desired length of the signal. Application of this C pulse causes conduction of the first tube 91 through the now closed contact 77 and the coil of the relay R102 to the line 83. Operation of this relay closes the load or signal contact **R102*a* to energize the bell or any desired signal over the lines 103** connected to the power lines.

As the C pulse is dropped, the relay R102 drops out and opens the contact **R102*a* to de-energize the signal 86. A series of reset pulses at the second carrier current frequency, indicated at D in Fig. 7, cause the tube 92 to conduct. These pulses act to energize the coil 27 and advance all of the cams 23 and 61, as previously described. This advance continues until the end 67 of the blade 31 passes the drop off point 71 on the cam 61, as shown in Fig. 2. Dropping off of the end 67 returns the transfer blade 31 to normal with contact 65 in the first gating circuit closed and opens the second gating circuit 94 connected to the second tube 92**. All subsequent reset D pulses have no effect on the unit.

By utilizing two carrier current frequencies in this manner, it can be seen that the number of pulses required to condition the selective switching devices for operation need not be precisely measured or counted. The only accurate control needed is to apply the correct number of advance pulses after all of the units are conditioned. In this manner should any of the switching devices be accidentally shifted by an extraneous pulse or the like which may have appeared on the power lines for any reason during idle time, premature operation of the signal units will not occur. Thus in each case all of the units are resynchronized each time any one of them is to be operated, and the necessity of synchronizing clocks at each switching device is eliminated.

From the foregoing it can be seen that an improved selective switching system has been provided which is positive in action and is effective to always resynchronize each unit to a selected angular position prior to receiving the advance pulses for selecting one or more of the units for operation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A selective switching device adapted to control a signalling member, both of which are connected to a power line over which switch control pulses are selectively transmitted at first and second carrier current frequencies, comprising first and second gating units tuned to respectively respond for conduction upon the application of pulses at the first and second carrier current frequencies, first and second gating circuits connected with said first and second gating units, respectively, a switch actuating mechanism selectively operated by said first and second gating circuits, switch means operated by said switch actuating mechanism for opening said first gating circuit and conditioning said second gating circuit after a series of pulses at the first carrier current frequency causes said first gating unit to conduct and operate said switch actuating mechanism, a load control circuit having a load control contact therein connected to said first gating unit, means operated by said switch actuating mechanism for closing said load control contact after the application of a predetermined number of pulses at the second carrier current frequency acts on said second gating unit to drive said switch actuating mechanism through said second gating circuit, and switching means responsive to the application of a pulse at the first frequency for conducting through said first gating unit and load control circuit to energize the signalling member, said switch actuating mechanism being further advanced by a series of second carrier current frequency pulses applied to said second gating unit to open said load control and second gating circuits and to condition said first gating circuit for conduction.

2. A selective switching device adapted to control a signalling member, both of which are adapted to be connected to a power line over which switch control pulses are selectively transmitted at first and second carrier current frequencies; comprising first and second gating units selectively tuned to respond for conduction upon the application of pulses at the first and second carrier current frequencies, respectively; first and second gating circuits coupled with said first and second gating units, respectively; a switch control mechanism; switch means coupled with said first and second gating circuits for controlling the operation of said switch control mechanism; first cam means actuated by said switch control mechanism, upon conduction of said first gating unit under the control of pulses at the first carrier current frequency, for operating said switch means to open said first gating circuit and close said second gating circuit; a signal control circuit having a contact therein; second cam means operated by said switch control mechanism in synchronism with said first cam means; switch means for connecting said signal control circuit to said first gating unit, said second cam means being responsive to operation of said switch control mechanism from said second gating circuit for preparing said signal control circuit; and relay means disposed in said signal control circuit and operative in response to a pulse supplied at the first carrier current frequency to said first gating unit for energizing the signal device; the switching device being reset through the application of a series of pulses at the second carrier current frequency acting on said second gating unit to drive said switch control mechanism to open said signal control circuit and operate said switch means to return the same to condition said first gating circuit.

3. A selective switching unit adapted to be connected to a power line over which pulses at first and second carrier current frequencies are selectively transmitted to control operation of a signalling device, comprising a receiving unit including first and second gating members for controlling first and second gating circuits connected to the power line, first and second frequency responsive circuits for respectively controlling conduction of said first and second gating members, a pulse responsive switch actuating mechanism, switch means for selectively connecting said first and second gating circuits to said switch actuating mechanism, electromagnet means in said switch actuating mechanism responsive to conduction over said first gating circuit under the control of pulses supplied at the first carrier current frequency for advancing said switch actuating mechanism, first cam means attached to said switch actuating mechanism for operating on said switch means to open said first gating circuit and prevent further operation by pulses at the first carrier current frequency and to close said second gating circuit, a load control contact connected with said first gating member, second cam means operative in response to advancement of said switch actuating mechanism by a predetermined number of pulses supplied to said second gating member at the second carrier current frequency to close said load control contact, and relay means associated with said load control contact and responsive to a pulse supplied at the first carrier current frequency at a later time interval through said first gating member for energizing the signalling device, said switch actuating mechanism being thereafter reset by the application of pulses at the second carrier current frequency operating through said second gating member to open said load control contact and operate said switch means to condition said first gating circuit for operation.

4. A selective switching device adapted to be connected to a power line over which first and second carrier current frequency pulses are transmitted comprising a receiving unit for controlling a work circuit, said receiving unit including first and second power conducting tubes connected to the power line, first and second tuned circuits connected to the power line and respectively to said first and second power tubes for selectively controlling conduction through the same, a transfer switch, means for connecting said power tubes to said transfer switch, a normally open load control switch connected to said first power tube, a pulse responsive oscillatable magnetic drive means coupled with said transfer switch, the application of pulses on the power line at the first carrier current frequency acting on said first tuned circuit to cause said first power tube to conduct through said transfer switch and oscillatable magnetic drive means to intermittently drive the same, first cam means responsive to predetermined movement of said magnetic drive means for actuating said transfer contact to disconnect said first power tube and connect said second power tube to said oscillatable magnetic drive means, second cam means operated in synchronism with said first cam means for selectively closing said load control switch, said magnetic drive means being operative by conduction of said second power tube upon the application of a predetermined number of pulses at the second carrier frequency applied to the second tuned circuit to close said load control contact, and means responsive to the reapplication of a pulse at the first carrier current frequency to cause said first power tube to conduct through said load control switch and energize the work circuit.

5. Selective switching devices for a plurality of signalling members adapted to be connected to a line over which first and second control pulses are transmitted, comprising a plurality of switching units, each including a first and a second gating circuit connected to the line to respectively conduct upon the application of the first and second control pulses, a switch actuating mechanism in each unit, switch means for normally connecting said first gating circuit to said switch actuating mechanism to drive the same, said first circuit being responsive to pulses conducted through the same to advance all of the switch actuating mechanisms, means responsive to repeated first pulses to all of said switching units to advance the same to predetermined positions for operating said switch means to open said first gating circuits and condition said second gating circuits, signal control switch means in each unit connected to said first gating circuit, means connected with said switch actuating mechanism for operating the related signal control switch means in a predetermined sequence in accordance with the selected number of second pulses, said switch actuating mechanism being operative by conduction of said second gating circuit to actuate all of said switch actuating mechanisms to selectively close and then open each of said signal control switch means in a predetermined sequence, and means responsive to a pulse applied over the first circuit for causing conduction through all of said signal control switch means in their closed position, said switch actuating mechanisms all being reset by repeat second pulses, to open all of the signal control switches and second gating circuits and to condition said first gating circuits for conduction.

6. Selective switching devices for a plurality of signalling members, each of which is adapted to be connected to a power line over which switch control pulses are transmitted at first and second carrier current frequencies, comprising a plurality of switching units, each including a first and a second gating circuit connected to the power line and tuned to respectively respond for conduction upon the application of the pulses at the first and second carrier current frequencies, a switch actuating mechanism in each unit, switch means for normally connecting said first gating circuit to said switch actuating mechanism to drive the same, said first gating circuit being responsive to pulses supplied at the first carrier current frequency for causing conduction through the same to advance all of the switch actuating mechanisms to a predetermined position for operating said switch actuating means to open said first gating circuits and condition said second gating circuits, signal control switch means in each unit connected to said first gating circuit, means associated with said switch actuating mechanisms for operating the related signal control switch means in a predetermined sequence in accordance with the selected number of second carrier current frequency pulses, said switch actuating mechanism being operative by conduction of said second gating circuit according to the predetermined sequence to actuate all of said switch actuating mechanisms for selectively closing certain of said signal control switch means, and means responsive to a single pulse applied at the first carrier current frequency for causing conduction through all of said signal control switch means in their closed position, said switch actuating mechanisms all being reset by repeated pulses applied at the second carrier current frequency to open all of the signal control switches and second gating circuits and to thereby condition said first gating circuits for conduction.

7. A selective switching unit adapted to be connected to a power line, over which first and second carrier current frequency control pulses are transmitted, comprising first and second cold cathode tubes, each having an anode, a cathode and a starting anode, said anodes being connected to one side of the power line, first and second resonant control circuits connected to the power line and to the starting anodes of said first and second cold cathode tubes, respectively, a magnetically operated oscillatable detenting mechanism including an operating coil, a transfer switch having normally closed and opened contacts connecting said coil to said power line, means for connecting the cathode of said first cold cathode tube to the normally closed side of said transfer switch, means for connecting the cathode of said second cold cathode tube to the normally open side of said transfer switch, a load device connected to the power line, a relay having a circuit including a normally open load control contact operated thereby to maintain said load device deenergized, first and second cams operated by said detenting mechanism for operatively actuating said transfer switch and said normally open load control switch, respectively, an oscillatable armature responsive to the energization of said coil by conduction of said first cold cathode tube in response to the first carrier current frequency for advancing the cams an increment for each pulse, a first cam follower responsive to the first cam position for operating said transfer switch to disconnect said first cold cathode tube and connect said second cold cathode tube to said coil, said coil being responsive to the second carrier current frequency pulses for advancing said cams through said detenting mechanism, and a second cam follower responsive to the second cam position for closing said load control contact, said relay being responsive to the reapplication of a first carrier current frequency pulse causing said first cold cathode tube to conduct through said load control contact for energizing said load device for the duration of the pulse, said detenting means being responsive to the reapplication of the second carrier current frequency pulses for advancing the cams to open the load control contact and return said transfer switch to normal.

8. A selective switching device adapted to control a signalling member, connected to a line over which first characteristic and second characteristic control pulse signals are transmitted, comprising first and second gating circuits connected to the line to respectively conduct upon the application of the first character and second character control pulse signals, a signal control switch connected with said first gating circuit, a switch actuating means including means responsive to conduction of said first gating circuit for positioning said switch actuating means for opening said first gating circuit and conditioning said second gating circuit, and thereafter responsive to conduction of said second gating circuit for positioning said switch actuating means for conditioning said signal control switch, and switching means serially coupled to said signal control switch and responsive to a subsequent conduction of said first gating circuit in response to the first characteristic signal for energizing the signalling member.

9. A combination as claimed in claim 8 wherein conduction of said second gating circuit following the energization of said signalling member operatively actuates said switch actuating means to open said signal control switch and said second gating circuit and to condition said first gating circuit.

10. A selective switching device adapted to control a signalling member, both of which are connected to a power line over which switch control pulses are selectively transmitted at first and second carrier current frequencies, comprising first and second gating units connected to the power line and tuned to respectively respond for conduction upon the application of pulses at the first and second carrier current frequencies, first and second gating circuits connected respectively with said first and second gating units, a switch actuating mechanism normally connected to said first gating circuit, a signal control switch connected with said first gating unit, the application of a pulse at the first carrier current frequency causing said first gating unit to conduct and operate said switch actuating mechanism, switch means responsive to movement of said switch actuating mechanism for opening said first gating circuit and conditioning said second gating circuit, the application of a pulse at the second carrier current frequency causing said second gating unit to conduct and operate said switch actuating mechanism for positioning said signal control switch, and relay means responsive to a subsequent conduction of said first gating unit through said signal control switch under the control of a pulse at the first carrier current frequency for energizing the signalling member, said switch actuating mechanism being responsive upon a later application of pulses at the second carrier current frequency to said second gating unit for opening said signal control switch and said second gating circuit and for returning said switch means to condition said first gating circuit.

11. A selective switching device for controlling a signalling member adapted to be connected to a power line over which pulses at first and second carrier current frequencies are selectively transmitted, comprising a receiving unit including first and second gating tubes connected to the power line, first and second tuned circuits connected to the power line for respectively controlling said first and second gating tubes, a pulse responsive switch actuating mechanism, switch means for connecting said first and second gating tubes to said switch actuating mechanism through first and second gating circuits, said switch actuating mechanism responsive to conduction of said first gating tube caused by the application of pulses of the first carrier current frequency to said first tuned circuit for advancing said switch actuating mechanism, said switching means actuated when said switch actuating mechanism reaches a predetermined position for opening said first gating circuit and conditioning said second gating tube circuit, a load control contact connected to the first gating circuit, said switch actuating mechanism being further operative to close said load control contact upon conduction of said second gating tube in response to a predetermined number of second carrier current frequency pulses applied to said second tuned circuit, and relay means responsive to conduction of said first gating tube through said load control contact upon the application of a pulse at the first carrier current frequency to said first tuned circuit to close a signalling circuit for energizing the signalling member.

References Cited in the file of this patent

UNITED STATES PATENTS

| | | |
|---|---|---|
| 2,041,079 | Lyle | May 19, 1936 |
| 2,069,860 | Stewart | Feb. 9, 1937 |
| 2,503,402 | McDavitt et al. | Apr. 11, 1950 |
| 2,523,315 | Mayle | Sept. 26, 1950 |
| 2,588,767 | Roseby | Mar. 11, 1952 |
| 2,591,937 | Herrick | Apr. 8, 1952 |
| 2,754,495 | Sprecker et al. | July 10, 1956 |